(12) United States Patent
Chung et al.

(10) Patent No.: US 7,440,784 B2
(45) Date of Patent: Oct. 21, 2008

(54) PORTABLE COMMUNICATION APPARATUS

(75) Inventors: Sung-Mo Chung, Seoul (KR);
Jong-Seong Lee, Seoul (KR);
Chang-Hwan Hwang, Goyang-si (KR)

(73) Assignee: Samsung Electronics Co., Ltd. (KR)

( * ) Notice: Subject to any disclaimer, the term of this patent is extended or adjusted under 35 U.S.C. 154(b) by 455 days.

(21) Appl. No.: 11/222,010

(22) Filed: Sep. 8, 2005

(65) Prior Publication Data

US 2006/0089183 A1 Apr. 27, 2006

(30) Foreign Application Priority Data

Oct. 25, 2004 (KR) .................... 10-2004-0085235

(51) Int. Cl.
*H04M 1/00* (2006.01)
(52) U.S. Cl. ................ 455/575.3; 455/575.1; 455/90.3; 455/556.1; 455/566; 379/433.01; 379/433.1; 379/433.13; 348/14.02; 348/14.07; 16/282; 16/287; 16/294; 16/302; 16/386
(58) Field of Classification Search .............. 455/575.1, 455/3, 556.1–2, 566, 557, 569.1–2, 90.1–3, 455/575.3; 379/428.01, 433.01, 4, 433.1, 379/433.11–13, 434, 433.04; 348/14.02, 348/4, 14.07, 14.04; 16/282, 287, 294, 302, 16/386

See application file for complete search history.

(56) References Cited

U.S. PATENT DOCUMENTS 6,658,272 B1 12/2003 Lenchik et al.
7,061,520 B2 * 6/2006 Choi ........................ 348/14.02
7,146,197 B2 * 12/2006 Kang et al. .............. 455/575.1
7,301,555 B2 * 11/2007 Navntoft ................... 348/14.02
2001/0004269 A1 * 6/2001 Shibata et al. ......... 348/333.06
2003/0064685 A1 4/2003 Kim
2003/0228847 A1 12/2003 Matsumoto
2004/0198474 A1 * 10/2004 Jung et al. ............... 455/575.1
2004/0203535 A1 * 10/2004 Kim et al. ................... 455/90.3

FOREIGN PATENT DOCUMENTS

EP 1 411 707 A1 8/2005

* cited by examiner

*Primary Examiner*—Tuan A Tran
(74) *Attorney, Agent, or Firm*—The Farrell Law Firm, PC (57) ABSTRACT

Disclosed is a portable communication apparatus. The portable communication apparatus includes a first housing including a plurality of keys, a second housing including a main display unit and being movable from the first housing about a first hinge axis and being rotated about a second hinge axis, which is perpendicular to the first hinge axis, and a swing hinge housing for allowing the second housing to rotate with respect to the first housing about the first and second hinge axes, which pass through the swing hinge housing. The swing hinge housing is provided at a lateral portion thereof with a camera lens. A bottom surface of the swing hinge housing is rotatably attached to an upper surface of the first housing so that the swing hinge housing is rotated together with the main display unit about the second hinge axis.

20 Claims, 7 Drawing Sheets

PORTABLE COMMUNICATION APPARATUS

PRIORITY

This application claims priority to an application entitled "Portable Communication Apparatus" filed with the Korean Intellectual Property Office on Oct. 25, 2004 and assigned Serial No. 2004-85235, the contents of which are incorporated herein by reference.

BACKGROUND OF THE INVENTION

1. Field of the Invention

The present invention relates to a digital communication apparatus, such as a cellular phone, a PDA (personal digital assistant), an HHP (handheld phone), a camera phone, a game phone, or an Internet phone, and more particularly to a portable communication apparatus that can be conveniently used as a camera by allowing the camera lens to rotate together with a display unit.

2. Description of the Related Art

In general, a "portable communication apparatus" refers to an electronic appliance for wire/wireless communication between users. In consideration of portability, designs of such portable communication apparatuses are not only compact, slim, and light, but also include multimedia availability with a wider variety of functions. Future portable communication apparatuses are expected to incorporate even greater multi-functionality and multi-purpose utilization while reducing size further. The portable communication apparatuses will likely be modified to be suitable for various multimedia environments or Internet environments. Such portable communication apparatuses are now commonly used by all kinds of people including men and women, young and the old, throughout the world, and are recognized by many as a necessary part of their daily lives.

Conventional portable communication apparatuses may be classified into various types according to their external appearances. For example, portable communication apparatuses are classified into bar-type communication apparatuses, flip-type portable communication apparatuses and folder-type portable communication apparatuses. In addition, some portable communication apparatuses can be worn on the neck or wrist. These variously classified portable communication apparatuses can be easily understood by those skilled in the art.

Conventional portable communication apparatuses transmit data at high speeds in addition to producing voice communication using wireless communication technology capable of transmitting data at a high speed.

Currently, portable communication apparatuses are often equipped with camera lenses that enable transmission of an image signal or enable a user to photograph a desired subject.

Bar-flip type portable communication apparatuses and sliding-swing type portable communication apparatuses are known and the number of consumers using such portable communication apparatuses is increasing.

The above conventional portable communication apparatuses must be equipped with an antenna unit, a data input/output unit, and a data receiving/transmitting unit. In general, a keypad allowing users to input data using fingers is used for a data input unit. Additionally, a touch pad or a touch screen may also be used for data input. An LCD is generally used for data output.

The keypad includes a plurality of keys aligned in a predetermined pattern. Such keys consist of number keys, a send key, an end key and functional keys. In general, 15 to 20 keys are aligned on an upper surface of a housing of a portable terminal. Such keys are exposed so that the user can input data by pressing the keys. In addition, the conventional portable communication apparatuses include photographing units, such as camera lenses, that enable a user to communicate visually with a desired partner or to photograph a desired subject.

As demand for information greatly increases in Internet and multimedia environments, digital convergence for the portable communication apparatus has occurred. However, in spite of such technological and social advancement, the conventional portable communication apparatus is equipped with a liquid crystal display (LCD) unit having a fixed orientation and a camera module also having a fixed orientation. In particular, a hinge module and the camera module are installed in different positions on the portable communication apparatus requiring a relatively large-sized part mounting space which gets in the way of providing a compact device. In particular, manufacturing becomes increasingly difficult.

SUMMARY OF THE INVENTION

Accordingly, the present invention has been made to solve the above-mentioned problems occurring in the prior art, and an object of the present invention is to provide a portable communication apparatus that can be conveniently used in a camera mode by allowing a camera lens to rotate together with a display unit.

Another object of the present invention is to provide a portable communication apparatus capable of minimizing a part mounting space and simplifying a part mounting structure while improving assembling work for the portable communication apparatus by installing a biaxial hinge unit and a camera lens module in a single swing hinge housing.

In order to accomplish these objects, there is provided a portable communication apparatus including a first housing including a plurality of keys; a second housing including a main display unit and being movable from the first housing about a first hinge axis and being rotated about a second hinge axis, which is perpendicular to the first hinge axis; and a swing hinge housing for allowing the second housing to rotate with respect to the first housing about the first and second hinge axes, which pass through the swing hinge housing, the swing hinge housing being provided at a lateral portion thereof with a camera lens, a bottom surface of the swing hinge housing being rotatably attached to an upper surface of the first housing so that the swing hinge housing is rotated together with the main display unit about the second hinge axis.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

As shown in FIGS. 1 to 7, a portable communication apparatus according to the present invention includes first and second housings 10 and 20 and a swing hinge housing 30 for connecting the second housing 20 to the first housing 10 in such a manner that the second housing 20 can biaxially rotate about the first housing 10. In particular, according to the portable communication apparatus of the present invention, a camera lens 320, which will be described later in detail, is aligned at a rear lateral portion 30b of the swing hinge housing 30 in such a manner that an orientation of a main display unit 220 of the swing hinge housing 30 is opposite to a target direction of the camera lens 320, so the user can conveniently take photographs in a camera mode.

In detail, the portable communication apparatus according to the present invention includes the first housing 10, the second housing 20 coupled to the first housing 10 in such a manner that the second housing 20 facing the first housing 10 is movable into opened/closed positions with respect to the first housing 10, and the swing hinge housing 30 for connecting the second housing 20 to the first housing 10 in such a manner that the second housing 20 can biaxially rotate about the first housing 10. The first and second housings 10 and 20 preferably have plate-like shapes and the swing hinge housing 30 preferably has a box-like shape. The swing hinge housing 30 is provided at a predetermined position of an upper surface 10a of the first housing 10.

Preferably, the swing hinge housing 30 is positioned at a center portion of an edge of the first housing 10.

In detail, according to the portable communication apparatus of the present invention, the second housing 20 is rotatably coupled to the first housing 10 by means of the swing hinge housing 30 such that the second housing 20 may rotatably move from the first housing 10 about a first hinge axis A1 and may rotate about a second hinge axis A2. That is, the swing hinge housing 30 according to the present invention includes first and second hinge axes A1 and A2 which are perpendicular to each other. The first hinge axis A1 extends widthwise along the swing hinge housing 30 and the second hinge axis A2 extends in a direction perpendicular to an upper surface 30a of the swing hinge housing 30.

The first housing 10 is provided at an end of the swing hinge housing 30. The first housing 10 forms an upper surface 10a with a plurality of keys 110 and a microphone 112. In addition, a battery pack 114 and a pair of speakers 116 are provided at a bottom surface 10b of the first housing 10 for stereophonic sound. The speakers 116 generate stereophonic sound in the direction of a lateral portion 10c and the bottom surface 10b of the first housing 10.

The second housing 20 is movable towards or away from the first housing 10 about the first hinge axis A1. The second housing 20 has a bottom surface 20b with a speaker unit 210 and a main display unit 220 and forms an end with an opening 230. The opening 230 allows the second housing 20 to rotate about the first hinge axis A1 without being interrupted by the swing hinge housing 30. Preferably, the main display unit 220 includes an LCD.

The swing hinge housing 30 is preferably formed in a box-like shape and protrudes from one end of the first housing 10. The first and second hinge axes A1 and A2 extend through the swing hinge housing 30. The swing hinge housing 30 includes an upper surface 30a, a bottom surface (not shown), and a plurality of lateral portions 30b. The bottom surface of the swing hinge housing 30 is movably attached to the upper surface of the first housing 10 so as to guide the rotational movement of the second housing 20.

The second hinge axis A2 extends from a center of the swing hinge housing 30 perpendicular to the upper surface 30a of the swing hinge housing 30. The second hinge axis A2 is also perpendicular to the first hinge axis A1 so that the second housing 20 may biaxially rotate about the first and second hinge axes A1 and A2. When the second housing 20 rotates about the second hinge axis A2, the first hinge axis A1 rotates as well.

A single key 310 is provided at the upper surface 30a. In addition, the camera lens 320 is aligned at the rear lateral portion 30b of the swing hinge housing 30 so that the camera lens 320 is orientated towards a predetermined direction.

Figure 1:
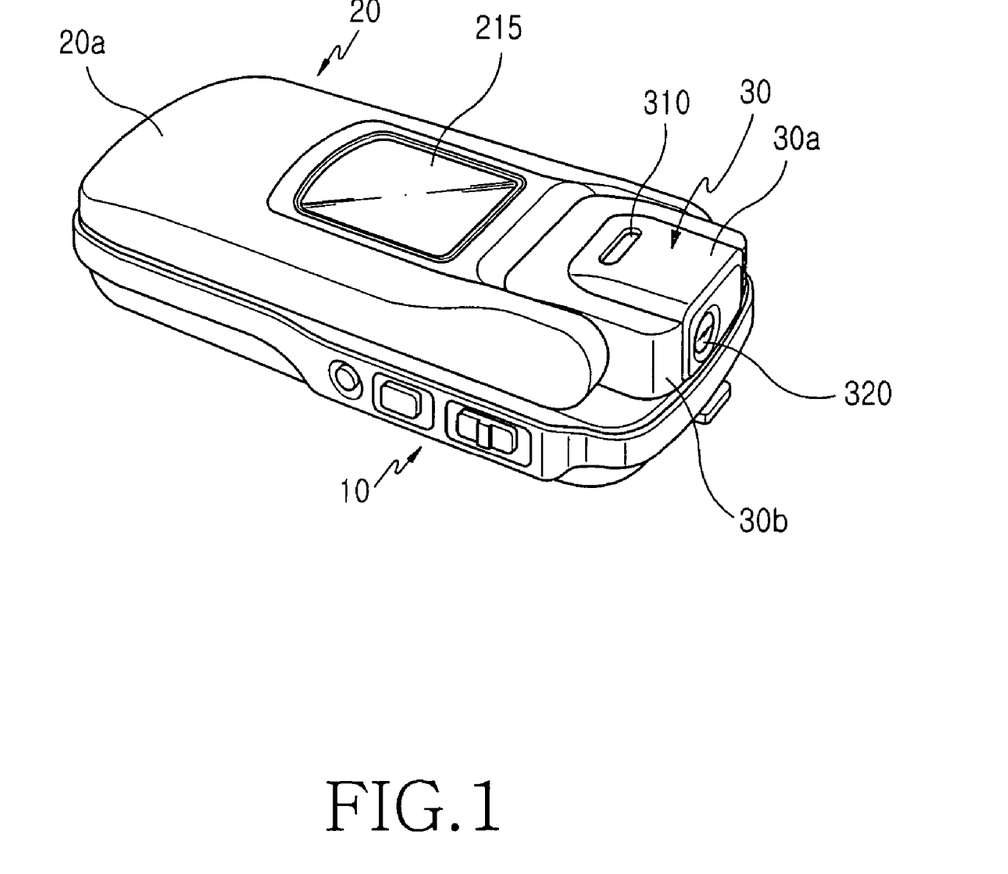
FIG. 1 is a perspective view illustrating a portable communication apparatus according to one embodiment of the present invention.
Figure 2:
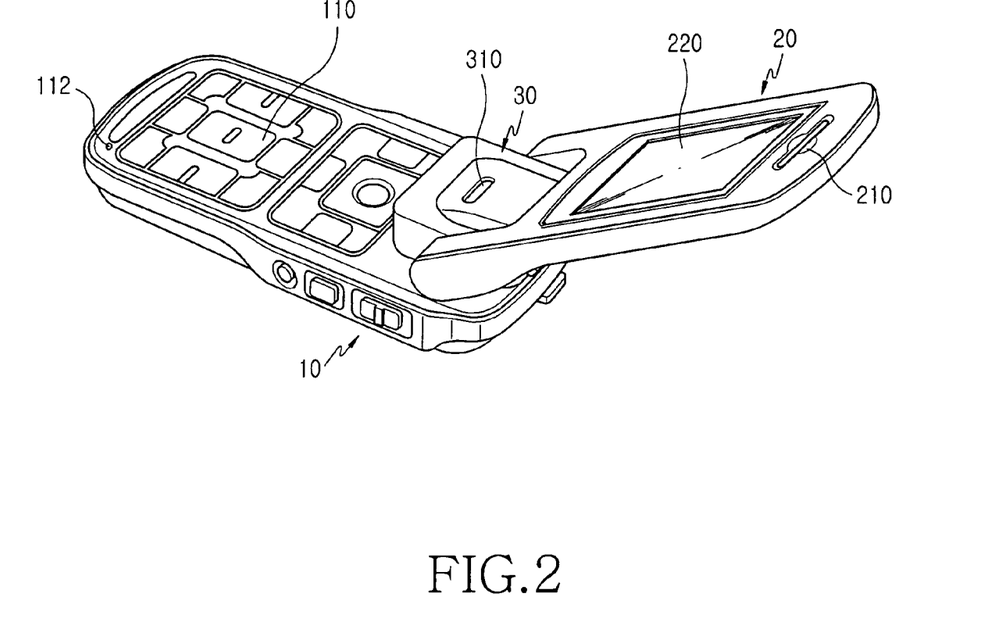
FIG. 2 is a perspective view illustrating the portable communication apparatus of FIG. 1, in a completely open position.
Figure 3:
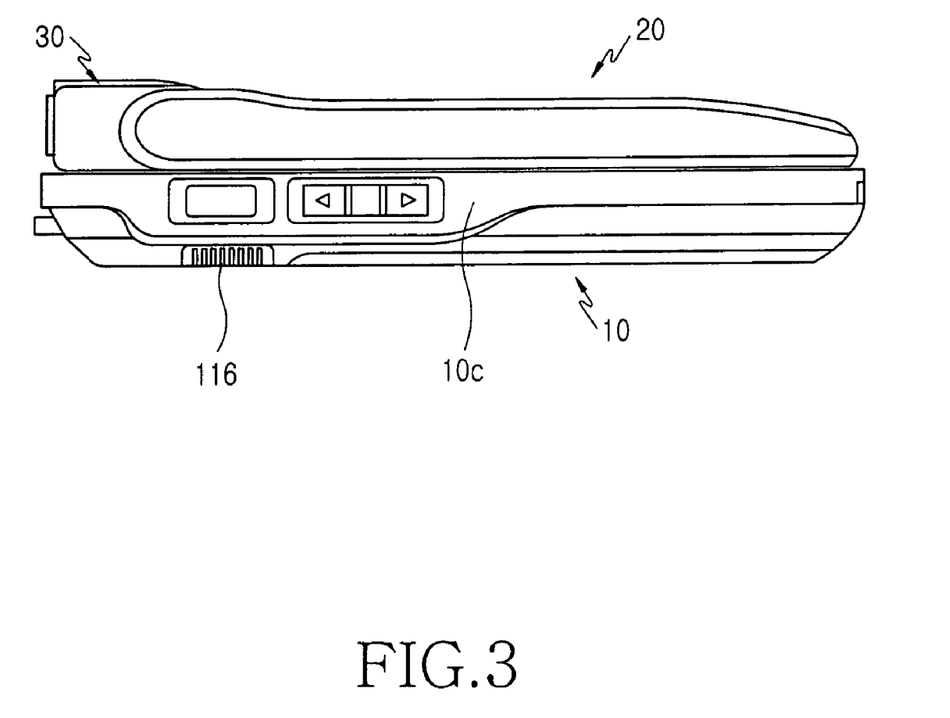
FIG. 3 is a side view of the apparatus of FIG. 1.
Figure 4:
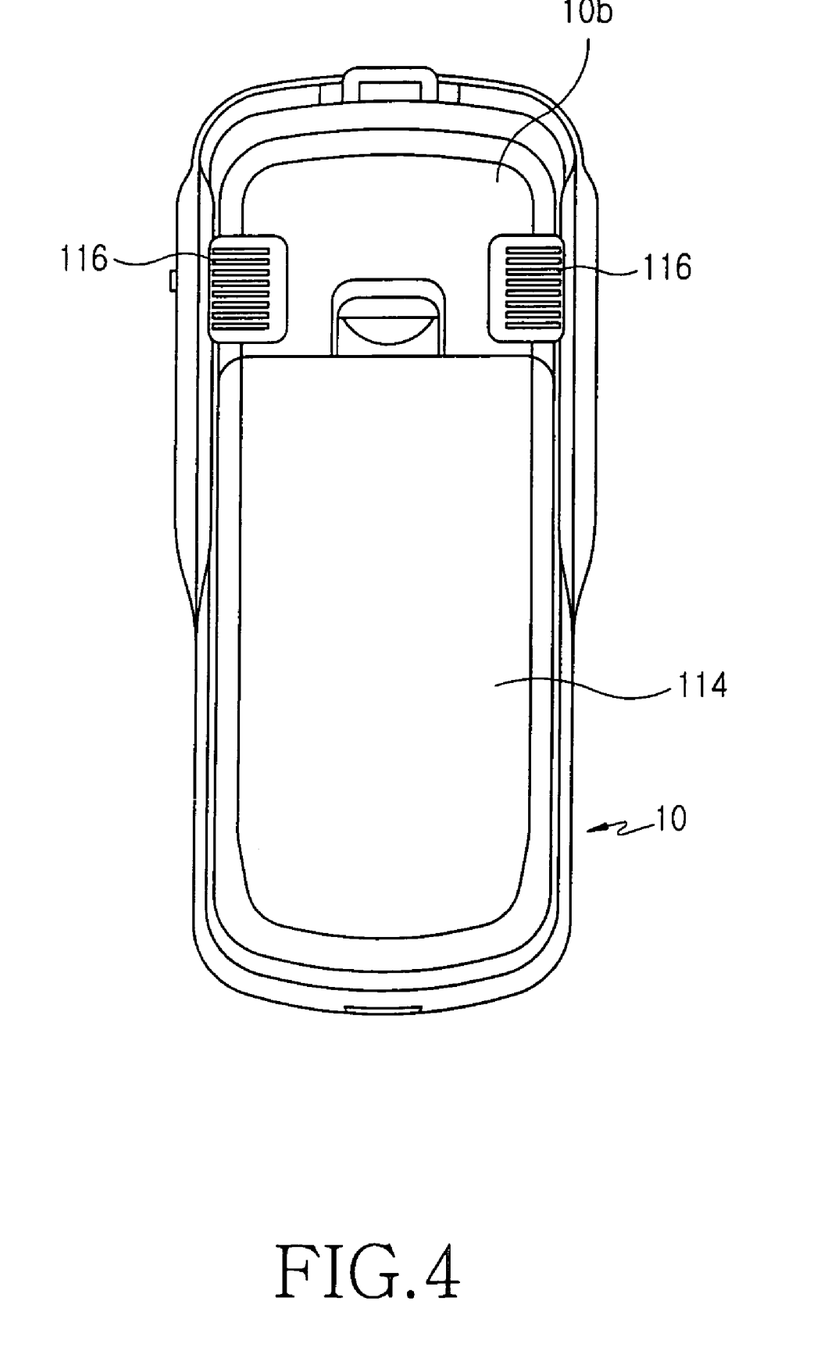
FIG. 4 is a rear view of the apparatus of FIG. 1.
Figure 5:
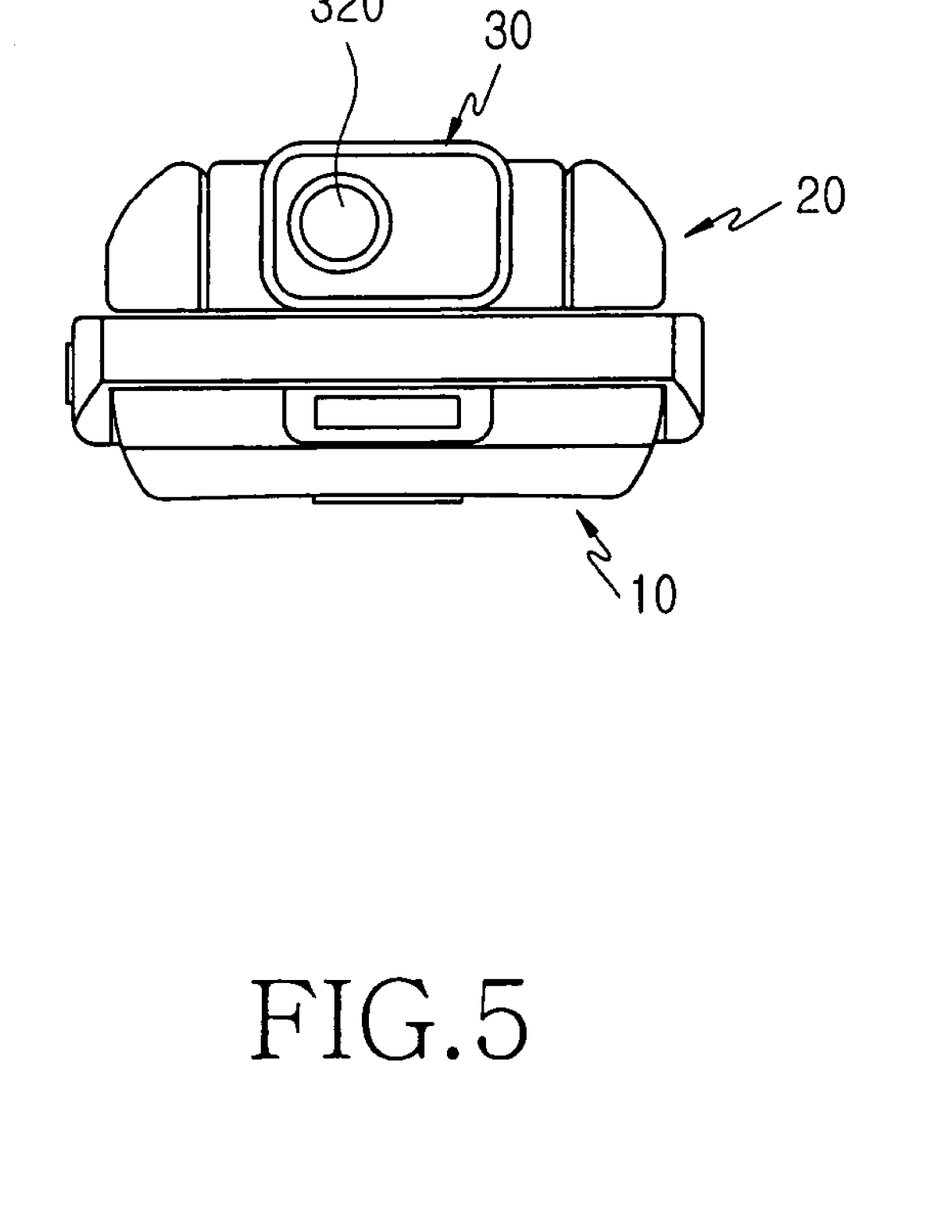
FIG. 5 is a front view of the apparatus of FIG. 1.

As shown in FIG. 1, when the second housing 20 is folded onto the first housing 10, the keys 110 of the first housing 10 are closely adjacent to the main display unit 220. As shown in FIG. 2, when the second housing 20 has been moved into the open-position with respect to the first housing 10, the speaker 210 is remotely spaced from the microphone 112, and the main display unit 220 and the keys 110 are exposed to an exterior.

Figure 6:
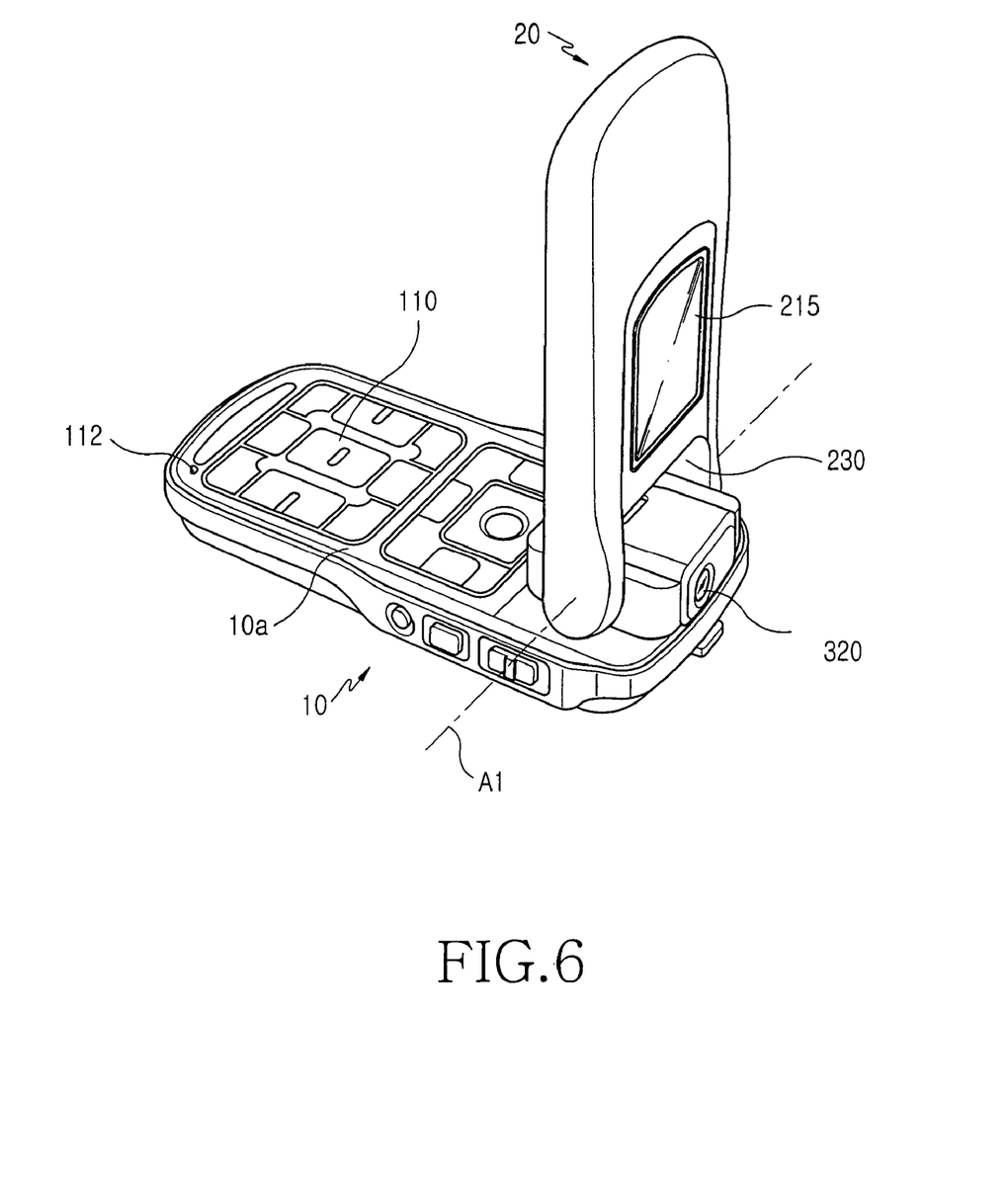
FIG. 6 is a perspective view illustrating the portable communication apparatus of FIG. 1 which a rotary housing has been rotated about a first hinge axis at a right angle.
Figure 7:
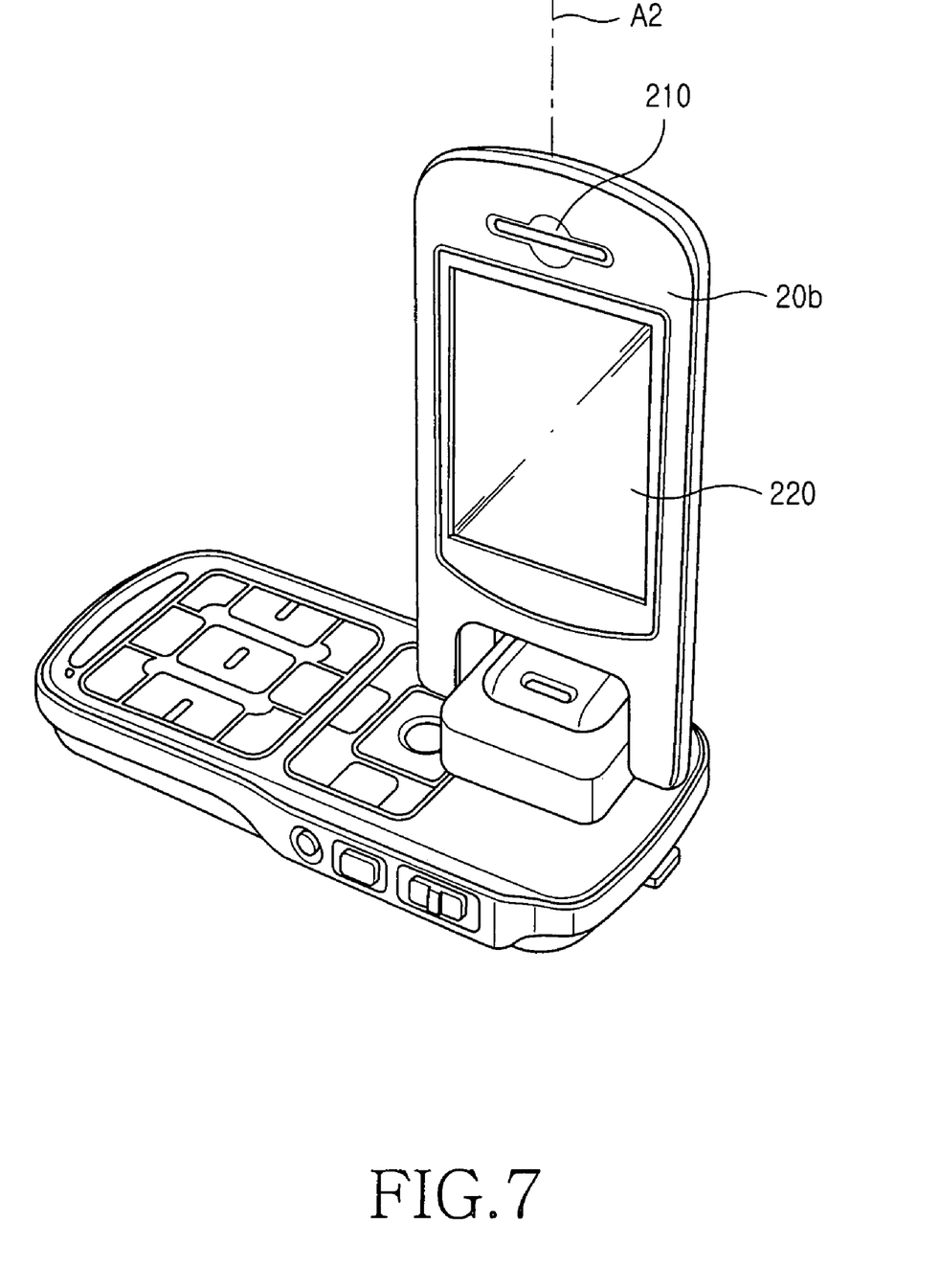
FIG. 7 is a perspective view illustrating the portable communication apparatus of FIG. 1 in which a rotary housing has been rotated about a second hinge axis at a right angle.

As shown in FIG. 6, when the second housing 20 is rotatably moved from the first housing 10 at a right angle, an orientation of the main display unit 220 is opposite to the direction the camera lens 320 faces. In this state, as shown in FIG. 7, if the second housing 20 rotates about the second hinge axis A2 at a right angle, the user can check an image of an object through the main display unit 220 while photographing the object, allowing the user to conveniently use the portable communication apparatus in a camera mode. Under the above situation, the first housing 10 may act as a grip part.

The user can check data through a sub-display unit 215 when the portable communication apparatus is in the closed position as shown in FIG. 1, and can check data through the main display unit 220 when the portable communication apparatus is in the opened position as shown in FIG. 2.

As shown in FIG. 6, the target direction of the camera lens 320 is perpendicular to the first and second axes A1 and A2.

As described above, according to the portable communication apparatus of the present invention, a second housing can biaxially rotate about the first and second hinge axes, so that a user can conveniently use the portable communication apparatus. In particular, since the main display unit may rotate together with the camera lens about the second hinge axis, the user can conveniently use the portable communication apparatus in a camera mode. In addition, since the hinge module providing the first and second hinge axes and the camera lens module are installed in a single housing, assembling and manufacturing of the portable communication apparatus is improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable communication apparatus comprising:
   a first housing including a plurality of keys;
   a second housing including a main display unit and being movable with respect to the first housing about a first hinge axis and being rotatable about a second hinge axis, which is perpendicular to the first hinge axis; and
   a swing hinge housing for allowing the second housing to rotate with respect to the first housing about the first and second hinge axes, which pass through the swing hinge housing, the swing hinge housing being provided at a lateral portion thereof with a camera lens, a bottom surface of the swing hinge housing being rotatably attached to an upper surface of the first housing so that the swing hinge housing is rotatable with the main display unit about the second hinge axis.

2. The portable communication apparatus as claimed in claim 1, wherein the camera lens is positioned at a center of a rear lateral portion of the swing hinge housing in opposition to the keys on the first housing.

3. The portable communication apparatus as claimed in claim 1, wherein the swing hinge housing is positioned at an upper edge portion of the first housing, remote from the keys on the first housing.

4. The portable communication apparatus as claimed in claim 1, wherein the second housing includes an opening for allowing the second housing to rotatably move about the first hinge axis without being interrupted by the swing hinge housing, a part of the swing hinge housing being accommodated in the opening.

5. The portable communication apparatus as claimed in claim 1, wherein the swing hinge housing has a box shape and is provided at an upper surface thereof with a single key.

6. The portable communication apparatus as claimed in claim 1, wherein the swing hinge housing is rotatable with the second housing.

7. The portable communication apparatus as claimed in claim 1, wherein the first hinge axis extends widthwise along the swing hinge housing, the second hinge axis extends upwardly by passing through a center of the swing hinge housing, and a target direction of the camera lens is perpendicular to both the first and second hinge axes.

8. The portable communication apparatus as claimed in claim 1, wherein the plurality of keys and a microphone are provided at the upper surface of the first housing, a pair of first speakers are provided at a bottom surface of the first housing, a sub-display unit is provided at an upper surface of the second housing, and a second speaker unit and the main display unit are provided at a bottom surface of the second housing.

9. The portable communication apparatus as claimed in claim 1, wherein, when the second housing is rotatably moved from the first housing about the first hinge axis at a right angle or when the second housing is rotated about the second hinge axis at a right angle, an orientation of the main display unit is opposite to a target direction of the camera lens.

10. A portable communication apparatus comprising:
    a first housing;
    a second housing; and
    a swing-hinge housing connected to the first housing and the second housing, the swing-hinge housing having a box-like shape with a top surface and a bottom surface being opposite to the top surface;
    wherein:
    the second housing is rotatable about a first axis and a second axis being perpendicular to the first axis and to the top surface; and
    the swing-hinge housing rotates about the second axis with the bottom surface rotatably attached to an upper surface of the first housing.

11. The portable communication apparatus of claim 10, wherein the swing-hinge housing further comprises a camera lens facing a target direction perpendicular to both the first axis and the second axis.

12. A portable communication apparatus comprising:
    a first housing including a plurality of keys and having a first upper surface;
    a second housing including a main display unit, being open and closed about a first hinge axis while facing the first upper surface, and being rotated about a second hinge axis perpendicular to the first hinge axis; and
    a swing hinge housing receiving a camera lens at a lateral portion of the swing hinge housing and having a swing bottom surface facing the first upper surface, the swing hinge housing being rotatably coupled to the first housing and the second housing respectively via the second hinge axis and the first hinge axis, the swing bottom surface rotating with the main display unit about the second hinge axis.

13. The portable communication apparatus as claimed in claim 12, wherein the camera lens is positioned at a center of a rear lateral portion of the swing hinge housing in opposition to the keys on the first housing.

14. The portable communication apparatus as claimed in claim 12, wherein the swing hinge housing is positioned at an upper edge portion of the first housing, remote from the keys on the first housing.

15. The portable communication apparatus as claimed in claim 12, wherein the second housing includes an opening for allowing the second housing to rotatably move about the first hinge axis without being interrupted by the swing hinge housing, a part of the swing hinge housing being accommodated in the opening.

16. The portable communication apparatus as claimed in claim 12, wherein the swing hinge housing has a box shape and is provided at a swing upper surface of the swing hinge housing with a single key.

17. The portable communication apparatus as claimed in claim 12, wherein the swing hinge housing is rotatable with the second housing.

18. The portable communication apparatus as claimed in claim 12, wherein the first hinge axis extends widthwise along the swing hinge housing, the second hinge axis extends upwardly by passing through a center of the swing hinge housing, and a target direction of the camera lens is perpendicular to both the first and second hinge axes.

19. The portable communication apparatus as claimed in claim 12, wherein the plurality of keys and a microphone are provided at the first upper surface, a pair of first speakers are provided at a first bottom surface of the first housing, a sub-display unit is provided at a second upper surface of the second housing, and a second speaker unit and the main display unit are provided at a second bottom surface of the second housing.

20. The portable communication apparatus as claimed in claim 12, wherein, when the second housing is rotatably moved from the first housing about the first hinge axis at a right angle or when the second housing is rotated about the second hinge axis at a right angle, an orientation of the main display unit is opposite to a target direction of the camera lens.

* * * * *